United States Patent [19]

Knoll

[11] Patent Number: 5,718,448
[45] Date of Patent: Feb. 17, 1998

[54] PROTECTIVE DEVICE FOR THE PASSENGERS OF A MOTOR VEHICLE, IN PARTICULAR TO A MOTOR CAR

[76] Inventor: Heinz Knoll, Schmellbachstrasse 38, 70565 Stuttgart, Germany

[21] Appl. No.: 764,517

[22] Filed: Dec. 12, 1996

[30] Foreign Application Priority Data

Dec. 12, 1995 [DE] Germany ............ 195 46 242.4

[51] Int. Cl.⁶ ................... B60R 21/22; B60R 21/08
[52] U.S. Cl. .......................... 280/730.1; 280/753
[58] Field of Search ................ 280/753, 730.1, 280/730.2, 749; 296/35.2

[56] References Cited

U.S. PATENT DOCUMENTS

| | | | |
|---|---|---|---|
| 2,806,737 | 9/1957 | Maxwell | 280/730.1 |
| 3,814,459 | 6/1974 | Eckels | 280/753 |
| 3,953,049 | 4/1976 | Surace et al. | 280/730.1 |
| 4,099,743 | 7/1978 | Non | 280/753 |
| 4,906,020 | 3/1990 | Haberer | 280/749 |
| 5,462,308 | 10/1995 | Seki et al. | 280/749 |
| 5,588,672 | 12/1996 | Karlow et al. | 280/730.2 |

FOREIGN PATENT DOCUMENTS 36 36 040 4/1988 Germany.

OTHER PUBLICATIONS

BMW ITS-System, May 1995, pp. 8-9.

*Primary Examiner*—Christopher P. Ellis
*Attorney, Agent, or Firm*—Evenson, McKeown, Edwards & Lenahan, P.L.L.C.

[57] ABSTRACT

Protective devices, which operate on the basis of impact and catch systems, including those of the inflatable gas bag type, require the vehicle either to be closed in order to accommodate the requisite components in the roof framework or the columns in which this framework is supported, or a steering wheel hub sufficiently large to accommodate the gas bag with the gas generator. Neither of which are available in motor racing vehicles. Therefore, a gas bag is inserted in a hose-shaped, folded state in a slit along the front region of the rim of an open cockpit. This gas bag can be brought immediately over and back across the steering wheel via a pulling mechanism into a position between the driver and steering wheel in the event of a vehicle collision.

29 Claims, 3 Drawing Sheets

PROTECTIVE DEVICE FOR THE PASSENGERS OF A MOTOR VEHICLE, IN PARTICULAR TO A MOTOR CAR

BACKGROUND AND SUMMARY OF THE INVENTION

The invention relates to a protective device for the passengers of a motor vehicle, in particular a motor car, where a catch or impact device is provided. The catch or impact device is brought into an operating position by means of an adjusting device triggered in the event of a collision, especially for an open-topped racing car.

Protective devices of the type mentioned above are already known (German Patent document DE 36 36 040 A1) for applications in closed vehicles such as limousines, for example, where swivelling levers are arranged in the area of the A-columns and in the area to the side of the roof frame. In the event of vehicle impact, the levers pivot out from the position in which they are retained behind the trim panel in the lateral area of the windscreen and in front of the side window, causing fabric catching devices, which are also retained folded in the lateral roof frame area and above the windscreen, to move into the region of impact about the head of the car passengers and tauten to form a catching device. This device is able to prevent the head of the car passenger from hitting the side window or the windscreen and is also able to stop the head or upper body of the car passenger from being pushed sideways though an open window, for example.

Another known system used for a similar purpose is to provide a hose-shaped gas bag and insert it in the folded state in the region of the A-column and the adjoining lateral region of the roof frame. These gas bags are thus retained secured to the body work at both ends and, in the invent of collision of the vehicle, are triggered so as to inflate. This causes them to move out from their concealed position behind the trim panel and to be pulled up from the front towards the rear across the lateral window openings (BMW ITS-System; May 1995). In order to use either of these protective devices, however, it is necessary for the vehicle to be closed so that a lateral roof framework is provided. This does not apply to open-topped vehicles and in particular to sports and racing cars.

Increased attempts have been made in recent times to come up with a device that can be fitted to vehicles to protect the drivers of racing cars, in particular Formula One participants, in the event of collision. The idea of providing what is referred to as an airbag in addition to the now common seat-belt has been considered. Putting this idea into practice has always been prevented until now because of the problem inherent in the fact that the space available in the cockpit is very restricted and the diameter of the steering wheel in particular, which is often designed as a steering wheel segment only, is too small to be able to accommodate an airbag.

The underlying objective of the present invention is to provide a protective device of the type outlined above, enabling gas bags, which have now become known as airbags, to be used as a protective device in sports cars too.

In order to achieve the objective of the invention, the catch or collision device provided is designed as an inflatable gas bag, which folds or rolls up in the manner of a hose in the non-activated state. The bag is housed in a slit in the front region of the circumferential rim of the open cockpit. At least one pyrotechnically operable pulling element is provided as the adjusting device. The element engages one end of the gas bag, the other end thereof being attached to the body work. An arrangement whereby the gas bag can be guided over the steering wheel into an operating position between the steering wheel and the driver when the pulling element is activated is provided as well. This layout provides a protective device whereby, in the event of a vehicle collision, an inflated gas bag is provided between the steering wheel and the driver but, unlike other vehicles, it does not have to be housed in the steering wheel itself. In its operating position, this inflated gas bag is supported, as is the case with other known airbag designs, on the steering wheel so as to protect the driver. The decisive advantage of this is the fact that the driver's hands cannot be affected at all. During the accident, the hands may remain on the steering wheel so that the vehicle driver can continue steering if necessary. This is further assisted by the fact that the size and shape of the gas bag are such that it lies underneath the driver's line of sight when in the operating position and the inflated state.

In another embodiment of the invention, the pulling element can be designed as at least one piston which can be moved inside a cylinder provided with a drive unit and which is joined to the gas bag via a cable or belt. By dint of this design, one end of the folded gas bag can be so attached to the lateral rim of the cockpit that it moves in front of the steering wheel in the operating position and can be immediately pulled into the operating position by means of its other end, which may still be located in the region of the cockpit rim in front of the steering wheel in the stand-by position, whereby the process of inflating the gas bag is not terminated until the gas bag has assumed the operating position. It is also possible to join both ends of the gas bag to a pulling member, which is linked to a piston that can be moved in a cylinder. In this case, at each of the areas where it is attached to the pulling members, the gas bag can be connected to gas generators, which can inflate it from either side.

In another embodiment of the invention, where the upper edge of the steering wheel stands higher than the front rim of the cockpit, a guide device, e.g. a swivelling lever, can be pivotally mounted to the side of the cockpit. The lever is attached at its free end to the belt. When pivoted by its free end, the lever travels through a semi-circular path, the highest point of which is higher than the upper edge of the steering wheel. Even with cockpits/steering wheels of this design, the system allows the gas bag to be pulled above and back across the steering wheel into the desired operating position. Obviously, it is simpler if the slit on the rim of the cockpit is located at a higher level than the upper edge of the steering wheel in the first place, since this would obviate the need for a pivot-lever mechanism.

In another embodiment of the invention, the gas bag can be connected at its end facing away from the pulling element to a gas generator mounted on the vehicle to handle the inflating process. This arrangement may be such that a trigger mechanism is provided. The trigger mechanism would activate the pulling element slightly before the gas generator, so that the movement of the gas bag into its subsequent operating position will not be hampered under any circumstances by the inflating process. It is also possible to use a multi-stage operated gas generator which would ensure that the gas bag would continue to be inflated over a longer period.

Finally, the design may also be such that the gas bag is attached to the pulling element via a releasable fastening element, with which it is possible to suspend the gas bag outwards, for example for the purpose of rescuing the driver.

A snap hook or possibly a pyrotechnically releasable push-button cable cap element could be used as a fastening element in such a case.

Other objects, advantages and novel features of the present invention will become apparent from the following detailed description of the invention when considered in conjunction with the accompanying drawings.

DETAILED DESCRIPTION OF THE DRAWINGS

Figure 1:
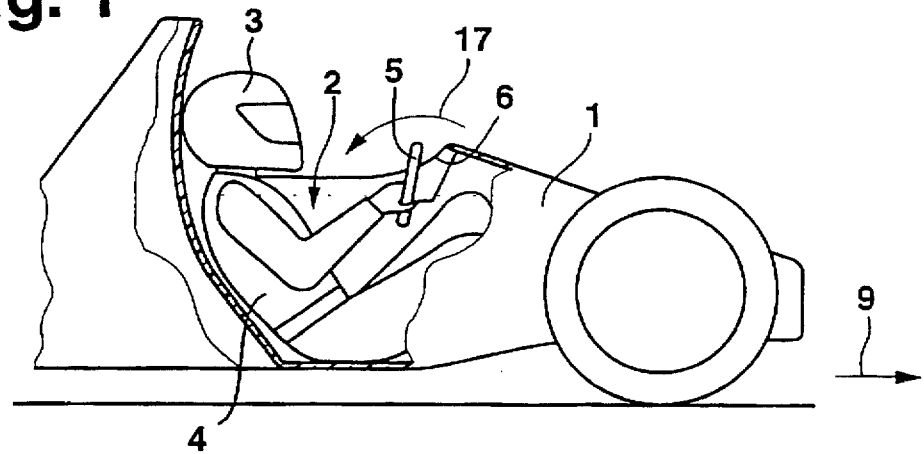
FIG. 1 is a schematic partial side view of a motor racing vehicle with an open-topped cockpit.

FIG. 1 is a diagram showing the front region of a motor racing car (1)—such as used in Formula One racing, for example—with the cockpit (2) open towards the top, from which the head of the driver (4), protected by a helmet (3), projects. Arranged in the front section of the cockpit (2) is the steering wheel (5), the upper edge of which lies, for aerodynamic reasons, slightly below the upstanding rim (6) to the front of the cockpit (2).

Figure 2:
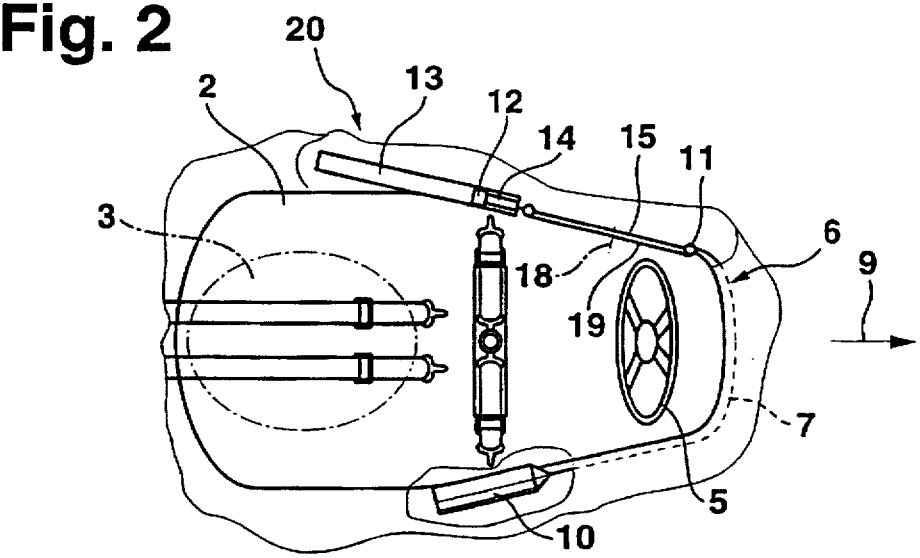
FIG. 2 is a view into the cockpit opening of the motor vehicle of FIG. 1 from above, with the protective device of the invention in the stand-by position.

It can be seen from FIG. 2 that a hose-shaped folded gas bag (7) is placed along the front area of the rim (6) of the open-top cockpit (2), inserted in a slit (8) or a channel on the rim (6) of the cockpit (FIGS. 6 and 7), where it runs along the rim (6) in the front region of the cockpit (2) in this stand-by position, retained inside the slit (8) by means of an elastic lip or a brush seal, for example. The right-hand end of the gas bag (7) in the driving direction (9) is permanently secured, as illustrated in FIG. 2, to a gas generator (10) mounted to one side underneath the cockpit rim (6), which inflates the gas bag (7) in the event of a vehicle collision detected by a sensing device in a known manner.

Figure 3:
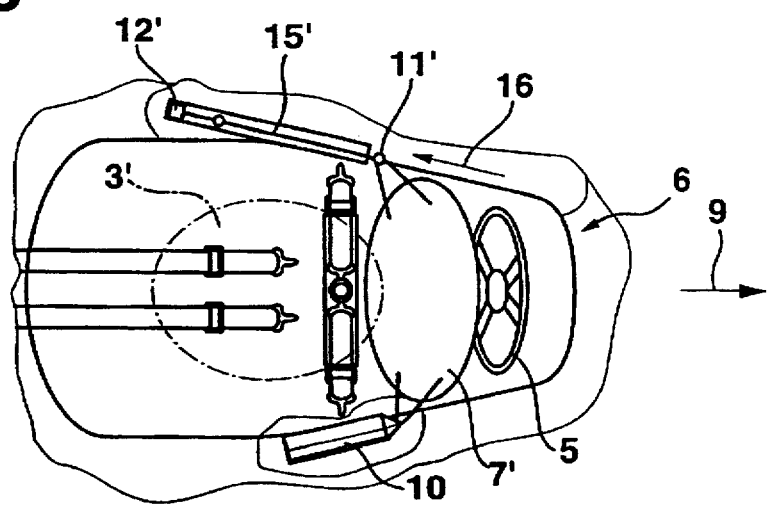
FIG. 3 is a view from above into the cockpit opening of FIG. 2, but with the protective device activated and in the operating position.

The left-hand end of the gas bag (7) is secured at the point (11) by means of a quick-release snap hook, for example, to an appropriately designed belt strap (15) or to a cable-pull, which in turn is permanently connected by the end remote from the anchorage point (11) to a piston (12) which slides inside a cylinder (13) also secured underneath the rim (6) of the cockpit (2). Located in front of the piston (12), looking in the direction towards the anchorage point (11) of the gas bag (7), is a pyrotechnic drive device (14) of a known type. The drive device (14) can be triggered by means of the previously mentioned sensing device, as can the gas generator (10). When this happens, the piston is sharply pushed out of the position in which it is illustrated in FIG. 2 into the position (12') shown in FIG. 3, causing the anchorage point (11) to move in the direction of the arrow (16) into the position (7') behind the steering wheel (5), i.e. it is thus pulled between the driver and the steering wheel and back across the steering wheel in the direction of the arrow (17) of FIG. 1. The gas bag (7) is illustrated in the inflated state in FIG. 3. It serves as an impact bag for the head and helmet of the driver as they move forward into the position (3') in the event of impact. The gas bag (7') is then supported on the steering wheel (5) in a manner known from other airbag systems.

Figure 4:
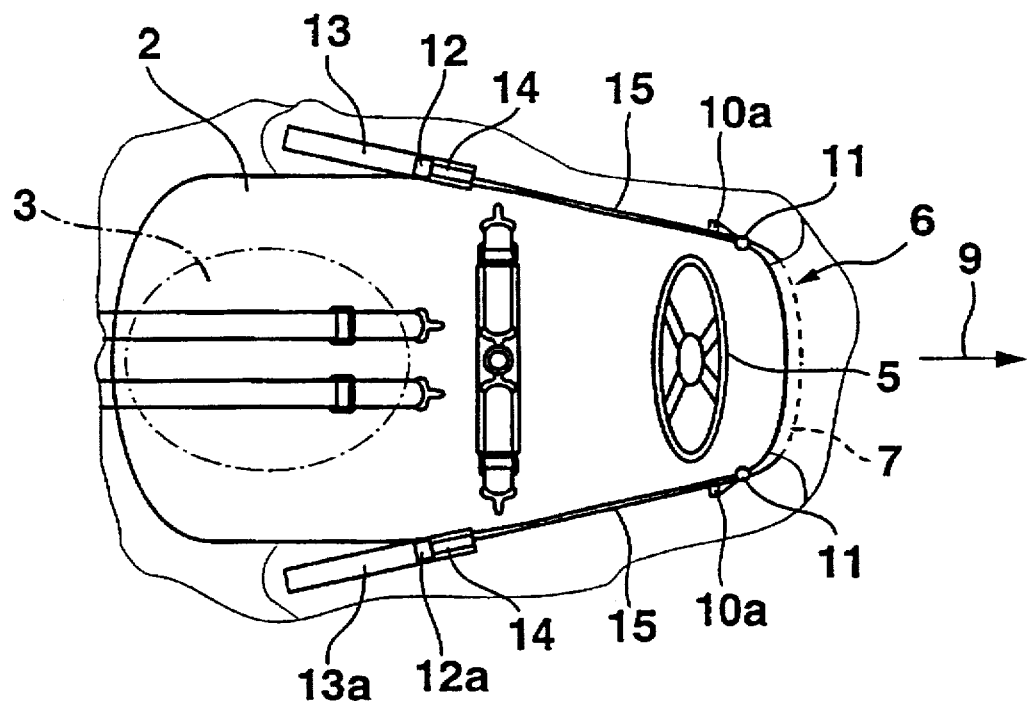
FIG. 4 a view from above into the cockpit opening, similar to FIG. 2, but showing a different embodiment according to the invention.
Figure 5:
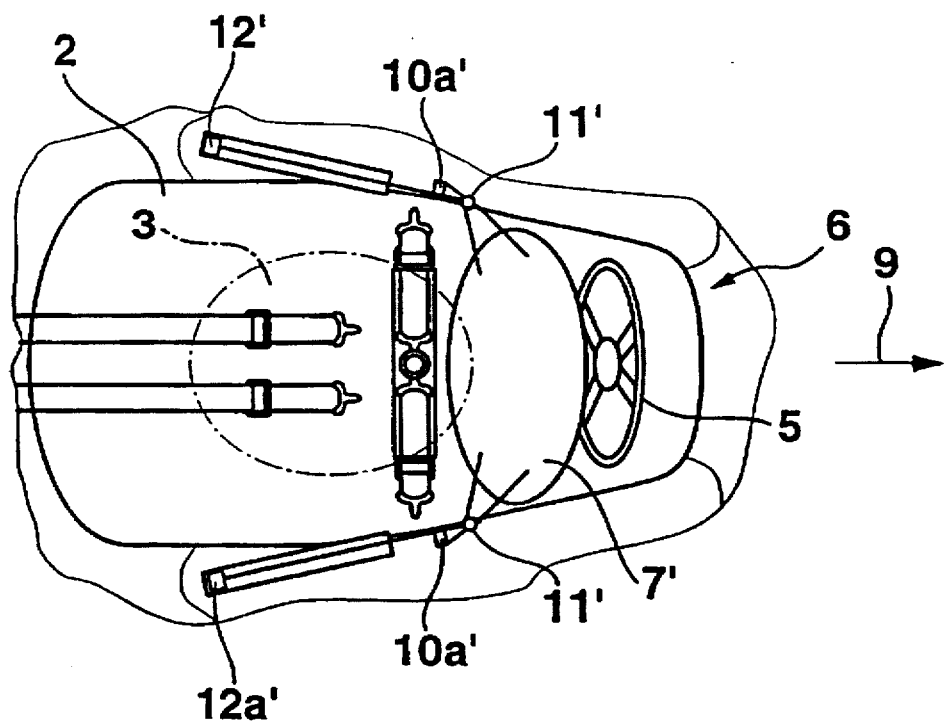
FIG. 5 is a view from above, similar to that of FIG. 3, into the cockpit opening of FIG. 4 with an activated protective device.

FIGS. 4 and 5 illustrate an alternative protective device insofar as in this case the gas bag 7 has at its two ends of the anchorage points 11 a belt strap 15 or a cable-pull respectively. Both belt straps 15 in this instance lead to a respective cylinder 13 or 13a secured underneath the rim of the cockpit. Again, as was the case with the embodiments of FIGS. 2 and 3, pistons 12 or 12a are arranged in these cylinders and are moved by a drive device 14. In this case both ends of the gas bag 7, i.e in the region of the respective anchorage points 11, are connected to gas generators 10a, which are moved with the pulling member when the gas bag is activated into the position 10a '(FIG. 5) and are therefore designed to be smaller in size. One of the reasons why this is possible with this particular embodiment is because inflation can be effected from both sides of the gas bag 7. Other substances for generating the gases used for the inflation process can be considered, which will allow the gas generators to be smaller in construction.

Figure 6:
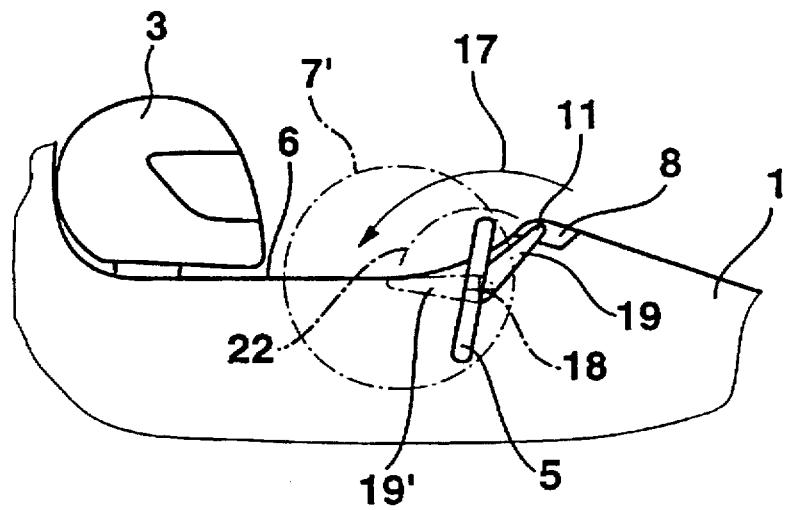
FIG. 6 is an enlarged partial side view of the cockpit area of FIG. 1 in a first embodiment design.

So that the gas bag can be moved out from the slit (8) and back across the steering wheel in the direction of the arrow (17) (FIG. 1), an arrangement can be provided in all the embodiment types illustrated by FIGS. 2 or 4 which will ensure that if the front part of the rim (6) of the cockpit (2) protrudes only slightly or not at all above the upper edge of the steering wheel (5), the belt (15) can also be pulled out across the steering wheel with the impact bag (7). FIG. 6 illustrates how a swivelling lever (19) on an axle (18) can be pivotally mounted to the side where the belt strap (15) is located, the free end thereof being secured to the belt (15), for example, also at the anchorage point (11) of the gas bag (7). For this example, FIG. 2 illustrates the position of the anchoring axle (18) and the initial position of the swivelling lever (19). It would also be conceivable to arrange a spring strap to the side acting as a crank guide, which would snap upwards from a position underneath the cockpit rim when the pulling element was triggered.

FIG. 6 clearly illustrates the fact that when the drive device (14) of the pulling mechanism (20), comprising the piston (12) and the cylinder (13), is activated, the swivelling lever (19) is also pivoted, together with the movement of the anchorage point (11), backwards in the direction of the arrow (17) into the position (19'). In conjunction with this pivoting movement, the gas bag (7) can be safely fed back over the steering wheel (5) into its operating position (7').

Figure 7:
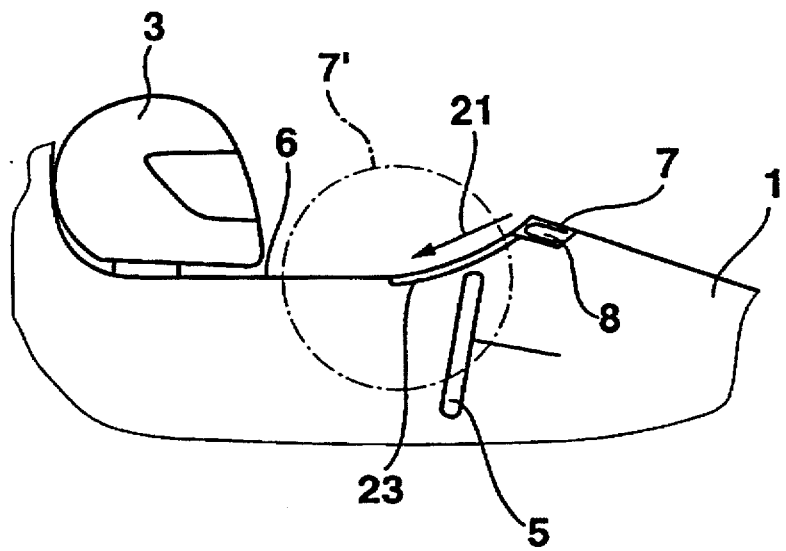
FIG. 7 is a diagram of the cockpit area of FIG. 6 but, of a different embodiment according to the invention.

Finally, FIG. 7 illustrates a simpler variant, in which there is no need to incorporate a swivelling lever(19). In this case, the design is such that the front rim (6) of the cockpit stands so high up that it lies above the upper edge of the steering wheel (5). This being the case, the end of the gas bag (7) merely has to be pulled out from the slit (8) in the direction of the arrow (21) when the drive device (14) is operated for it to be released over the steering wheel (5) and bring the impact bag into the operating position (7') between the driver's head (helmet) (3) and the steering wheel (5). If required or desirable, a slide guide (23) could also be provided on the upper rim of the cockpit, which would guide the gas bag safely into the position in front of the steering wheel (5).

In all cases, the sensing mechanism which triggers the pyrotechnic drives in the event of a vehicle collision can be so designed that the drive (14) for the pulling element is also triggered, in a known manner, slightly before the gas generator (10), also provided with a pyrotechnic drive device. This is done so that the gas bag (7) will not be inflated to such an extent that its release from the slit (8) into the operating position (7') is hampered.

Finally, provision may also be made so that the gas generator (10) has several gas-generating charges, which can each be ignited either by an electric a igniter or ignited in succession in a pyrotechnic manner. Providing a gas generator of this type will mean that the gas bag will continue to be inflated for a longer period in its operating position.

The design described will enable an impact-bag protective device of a known type to be provided for drivers of motor racing vehicles, for whom it has been impossible to provide impact-bag safety devices until now for reasons of space.

Clearly, it would also be conceivable device as specified by to be fitted in other motor vehicles having a restricted cockpit, such as aircraft, for example.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A protective device for passengers in a motor vehicle wherein one of a catch and impact mechanism is brought into an operating position via an adjusting device triggered in the event of a collision, the protective device comprising:
   an inflatable gas bag folded in a hose-like manner in a non-activated position, said gas bag being housed in a slit arranged in a front region of a circumferential rim of an open cockpit of the motor vehicle;
   at least one pyrotechnically operable pulling element provided as said adjusting device, said pulling element engaging with at least one end of said gas bag; and
   an arrangement wherein said gas bag is guided over a steering wheel into a working position between said steering wheel and a driver when said pulling element is activated.

2. A protective device according to claim 1, wherein said gas bag has a size and shape so as to lie below a driver's line of sight in the working position and in an inflated state.

3. A protective device according to claim 1, wherein said pulling element includes at least one piston movable into a cylinder connected to a drive device, said at least one piston being connected to at least one end of said gas bag via one of a cable and belt.

4. A protective device according to claim 2, wherein said pulling element includes at least one piston movable into a cylinder connected to a drive device, said at least one piston being connected to at least one end of said gas bag via one of a cable and belt.

5. A protective device according to claim 1, further comprising two gas generators connected to said gas bag, each of said gas generators being joined to one end of said gas bag in a region of anchorage points for said pulling elements.

6. A protective device according to claim 2, further comprising two gas generators connected to said gas bag, each of said gas generators being joined to one end of said gas bag in a region of anchorage points for said pulling elements.

7. A protective device according to claim 3, further comprising two gas generators connected to said gas bag, each of said gas generators being joined to one end of said gas bag in a region of anchorage points for said pulling elements.

8. A protective device according to claim 5, wherein said two gas generators are connected to said pulling element.

9. A protective device according to claim 1, further comprising at least one guide mechanism provided on a side of said open cockpit, by which said gas bag is lifted up across said steering wheel.

10. A protective device according to claim 9, wherein said at least one guide mechanism includes at least one swivelling lever, said swivelling lever being connected to said gas bag at a free end and travelling through a semi-circular path when pivoted by said free end, wherein a highest point of said semicircular path is higher than an upper edge of said steering wheel.

11. A protective device according to claim 1, wherein said slit on said rim of said open cockpit is arranged at a higher level than an upper edge of said steering wheel.

12. A protective device according to claim 1, wherein at an end arranged fixed to a body work of the motor vehicle, said gas bag is mounted on a gas generator which is secured to said body work.

13. A protective device according to claim 2, wherein at an end arranged fixed to a body work of the motor vehicle, said gas bag is mounted on a gas generator which is secured to said body work.

14. A protective device according to claim 3, wherein at an end arranged fixed to a body work of the motor vehicle, said gas bag is mounted on a gas generator which is secured to said body work.

15. A protective device according to claim 1, further comprising a trigger device via which said pulling element is activated slightly before said gas generator.

16. A protective device according to claim 2, further comprising a trigger device via which said pulling element is activated slightly before said gas generator.

17. A protective device according to claim 3, further comprising a trigger device via which said pulling element is activated slightly before said gas generator.

18. A protective device according to claim 10, further comprising a trigger device via which said pulling element is activated slightly before said gas generator.

19. A protective device according to claim 1, wherein said gas generator is fitted with several gas-generating charges.

20. A protective device according to claim 2, wherein said gas generator is fitted with several gas-generating charges.

21. A protective device according to claim 3, wherein said gas generator is fitted with several gas-generating charges.

22. A protective device according to claim 10, wherein said gas generator is fitted with several gas-generating charges.

23. A protective device according to claim 19, wherein each of said several gas generating charges is connected to an electric igniter.

24. A protective device according to claim 19, wherein said gas-generating charges are timed to be delayed in a pyrotechnical manner.

25. A protective device according to claim 19, wherein said gas generating charges are controlled in a delayed manner on one of the following basis: acceleration, time-delay, and path to ignite.

26. A protective device according to claim 3, wherein said gas bag is mounted so as to be rapidly released from an anchorage point.

27. A method for operating a protective device in a motor vehicle, the method comprising the steps of:

providing an inflatable gas bag folded in a hose-like manner in a slit arranged in a front region of a circumferential rim of a cockpit of the motor vehicle;

guiding said gas bag over a steering wheel into a working position between said steering wheel and a driver of said motor vehicle using at least one pyrotechnically operable pulling element which engages with at least one end of said gas bag when said gas bag is activated.

28. The method according to claim 27, wherein said guiding step further comprises the step of:

retracting at least one piston connected to at least one end of the gas bag into a cylinder connected to a drive device so as to pull said gas bag over said steering wheel.

29. The method according to claim 27, wherein said guiding step further comprises the step of:

pivoting a lever coupled at its free end to one end of said gas bag such that said free end traverses a semi-circular path, a highest point of said path being located higher than an upper edge of said steering wheel.

* * * * *